United States Patent
Premkumar et al.

(10) Patent No.: US 9,555,783 B2
(45) Date of Patent: Jan. 31, 2017

(54) WHEEL SPEED ESTIMATION USING A DRIVETRAIN MODEL

(75) Inventors: Jayant Premkumar, Ann Arbor, MI (US); Jiamu Hu, Rochester Hills, MI (US); Brad Lobbestael, Linden, MI (US); Hsien-cheng Wu, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 1363 days.

(21) Appl. No.: 13/039,586

(22) Filed: Mar. 3, 2011

(65) Prior Publication Data
US 2012/0226469 A1 Sep. 6, 2012

(51) Int. Cl.
*B60T 8/172* (2006.01)
(52) U.S. Cl.
CPC ....................................... *B60T 8/172* (2013.01)
(58) Field of Classification Search
CPC ...................................................... B60T 8/172
See application file for complete search history.

(56) References Cited

U.S. PATENT DOCUMENTS

| | | | |
|---|---|---|---|
| 4,818,037 A | 4/1989 | Mc Ennan | |
| 5,358,317 A | 10/1994 | Cikanek | |
| 5,452,207 A | 9/1995 | Hrovat et al. | |
| 5,652,485 A | 7/1997 | Spiegel et al. | |
| 5,751,579 A | 5/1998 | Hrovat et al. | |
| 6,154,702 A | 11/2000 | Fodor et al. | |
| 6,640,178 B2 | 10/2003 | Wakamatsu et al. | |
| 6,834,217 B2 | 12/2004 | Erban | |
| 6,904,349 B2 | 6/2005 | Mori | |
| 7,203,578 B2 | 4/2007 | Kuang et al. | |
| 7,222,923 B2 | 5/2007 | Banno et al. | |
| 7,308,373 B2 | 12/2007 | Gaertner et al. | |
| 7,460,935 B2 | 12/2008 | Boesch et al. | |
| 7,577,507 B2 | 8/2009 | Morris | |
| 7,597,164 B2 | 10/2009 | Severinsky et al. | |
| 7,739,016 B2 | 6/2010 | Morris | |
| 7,957,881 B2 | 6/2011 | Itoh | |
| 2004/0117078 A1 | 6/2004 | Corcione et al. | |
| 2007/0142163 A1* | 6/2007 | Murray | 476/42 |
| 2007/0265756 A1 | 11/2007 | Joyce et al. | |

(Continued)

FOREIGN PATENT DOCUMENTS

| | | |
|---|---|---|
| DE | 19610864 | 9/1997 |
| WO | 81/03152 | 5/1980 |

OTHER PUBLICATIONS

Deakin, Linearization Using Taylor's Theorem, RMIT University, Geospatial Science, 2005.*

(Continued)

*Primary Examiner* — Gregory J Toatley
*Assistant Examiner* — Kyle R Quigley
(74) *Attorney, Agent, or Firm* — Michael Best & Friedrich LLP (57) ABSTRACT

A controller. The controller includes a processor and a non-transitory computer readable medium. The processor is configured to receive the speed of a first driven wheel from a wheel speed sensor and the speed of a drive shaft from a drive shaft sensor. The non-transistory computer readable medium includes program instructions executed by the processor for determining a speed of a second driven wheel based on a plurality of detected speeds of the first driven wheel and detected speeds of the drive shaft over time.

8 Claims, 6 Drawing Sheets

(56) References Cited

U.S. PATENT DOCUMENTS

| | | |
|---|---|---|
| 2007/0294018 A1 | 12/2007 | Nihanda |
| 2008/0059021 A1 | 3/2008 | Lu et al. |
| 2008/0059034 A1 | 3/2008 | Lu |
| 2008/0061625 A1 | 3/2008 | Schmitt et al. |
| 2008/0082246 A1 | 4/2008 | Brown et al. |
| 2008/0086248 A1 | 4/2008 | Lu et al. |
| 2008/0097684 A1 | 4/2008 | Syed et al. |
| 2009/0112428 A1* | 4/2009 | Sah .................................. 701/67 |
| 2009/0192689 A1* | 7/2009 | Dunn et al. ...................... 701/74 |
| 2011/0244810 A1* | 10/2011 | Czompo .......................... 455/73 |

OTHER PUBLICATIONS

Rowley, Dynamic and Closed-Loop Control, vol. 231 Progress in Astronautics and Aeronautics AIAA Chapter 5, 2009.*
PCT/US2012/025346 International Search Report and Written Opinion dated May 10, 2012 (8 pages).

* cited by examiner

WHEEL SPEED ESTIMATION USING A DRIVETRAIN MODEL

BACKGROUND

The invention relates to systems and methods for determining the speed of a driven wheel. Specifically, the invention determines the speed of a driven wheel using the speed of a drive shaft and the speed of a second driven wheel, and compensates for timing factors.

Vehicle systems, such as electronic stability control systems, require knowledge of the speed of each of the wheels of the vehicle. The speed of the wheels needs to be accurately determined in near real time (e.g., every 5 milliseconds). To achieve this, many modern vehicles use wheel speed sensors on each wheel with the sensors hard-wired to the control system or linked via a communication bus.

SUMMARY

In one embodiment, the invention provides a controller. The controller includes a processor and a non-transitory computer readable medium. The processor is configured to receive the speed of a first driven wheel from a wheel speed sensor and the speed of a drive shaft from a drive shaft sensor. The non-transistory computer readable medium includes program instructions executed by the processor for determining a speed of a second driven wheel based on a plurality of detected speeds of the first driven wheel and detected speeds of the drive shaft over time.

In another embodiment the invention provides a method of determining a speed of a first wheel of a vehicle. The vehicle includes a controller, a differential, a second driven wheel, and a drive shaft. The first and second wheels are driven by the drive shaft. The method includes detecting a speed of the second driven wheel, the second driven wheel driven by the differential, detecting a speed of the drive shaft, the drive shaft driving the differential, transmitting the speed of the second driven wheel to the controller, transmitting the speed of the drive shaft to the controller, compensating for delays in transmission of the speed of the second driven wheel and the drive shaft, compensating for differences in when the speed of the second driven wheel is detected and when the speed of the drive shaft is detected, and determining a speed of the first wheel, using the speed of the second driven wheel, the speed of the drive shaft, and the compensating acts, the first wheel driven by the differential.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
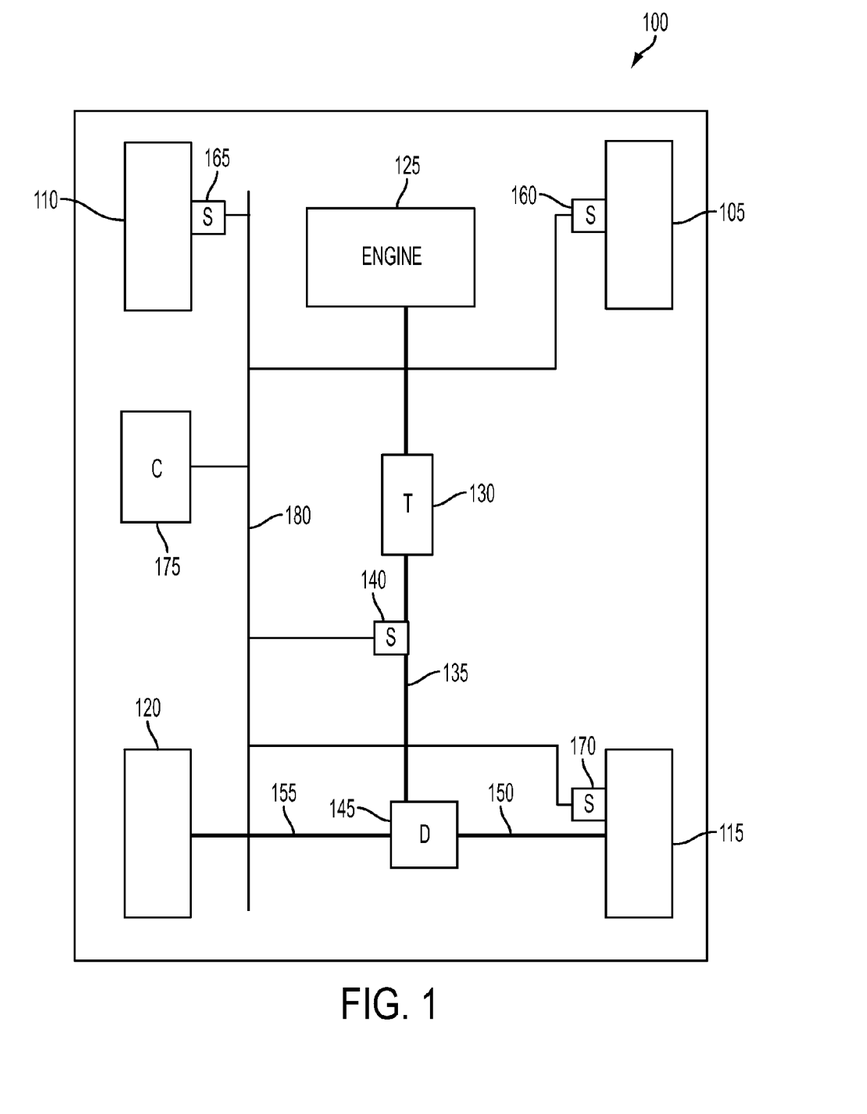
FIG. 1 is a block diagram of a vehicle.

FIG. 1 shows a block diagram of a vehicle 100. The vehicle 100 includes a right front wheel 105, a left front wheel 110, a right rear wheel 115, a left rear wheel 120, an engine 125, a transmission 130, a drive shaft 135, a drive shaft sensor 140, a differential 145, a right rear axle 150, a left rear axle 155, a right front wheel speed sensor 160, a left front wheel speed sensor 165, and a right rear wheel speed sensor 170. The vehicle 100 also includes a controller 175 (e.g., an electronic stability controller (ESC)) and a communication network 180 (e.g., a controller area network (CAN) bus). In some embodiments, the controller 175 and/or other modules include a processor (e.g., a microprocessor, microcontroller, ASIC, DSP, etc.) and memory (e.g., flash, ROM, RAM, EEPROM, etc.; i.e., a non-transitory computer readable medium), which can be internal to the processor, external to the processor, or both. The processor executes program code stored in the memory. Portions of the invention can be implemented in hardware or software or a combination of both.

The wheel speed sensors 160, 165, and 170 detect the speed of their respective wheels and communicate that speed to the controller 175. The speed can be communicated via the communication network 180 or directly (e.g., an analog signal, a PWM signal, etc.). Similarly, the drive shaft speed sensor 140 detects the speed of the drive shaft 135 and communicates that speed to the controller 175. The differential 145 is driven by the drive shaft 135 and divides the torque between the left and right rear wheels 120 and 115 such that the wheels can turn at different rates. The sum of the speeds of the left and right rear wheels 120 and 115 is two times the speed of the drive shaft 135 (assuming a one to one gear ratio). The controller 175 estimates the speed of one of the driven wheels 115 and 120 as described below (for the description below, the controller 175 estimates the speed of the left rear wheel 120).

The speed of the left rear wheel 120 can be approximated using equation 1 below. Solving for L, the determined speed of the left rear wheel, provides equation 2 below:

$$T=(L+R)/2 \quad \text{(eq. 1)}$$

$$L=2T-R \quad \text{(eq. 2)}$$

where T is the measured speed of the drive shaft 135, and R is the measured speed of the right rear wheel 115.

Figure 2:
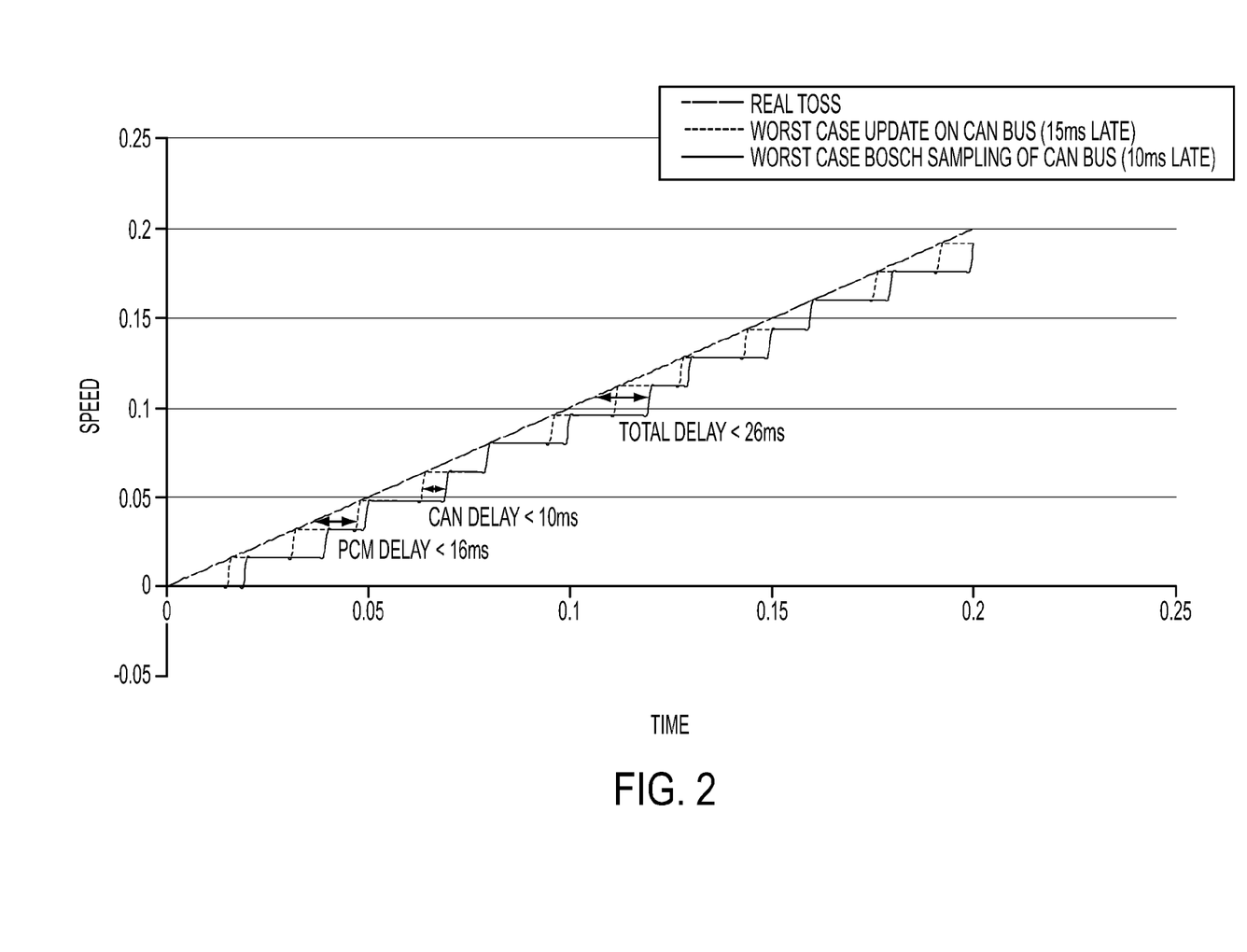
FIG. 2 is a chart showing an actual wheel speed and communication and computation delays.

Determining the speed of the left rear wheel 120 using these equations is generally accurate enough for use with anti-lock braking systems which update approximately every 50 msec. However, an ESC system updates approximately every 5 msec. If the measured speeds of the right rear wheel 115 and/or the drive shaft 135 are communicated to the controller 175 via a communications network 180, the controller 175 receives the measured speeds after a delay exceeding the ESC update time. For example, FIG. 2 shows delays that were measured in a system using a CAN bus. The CAN bus had a worst case delay in providing the speed information to the controller 175 of 15 msec. In addition, the controller 175 requires time to process the data it receives. In this case, up to an additional 11 msec. The total delay reached 26 msec. A delay of 26 msec is more than five times the update time for the ESC system.

Figure 3:
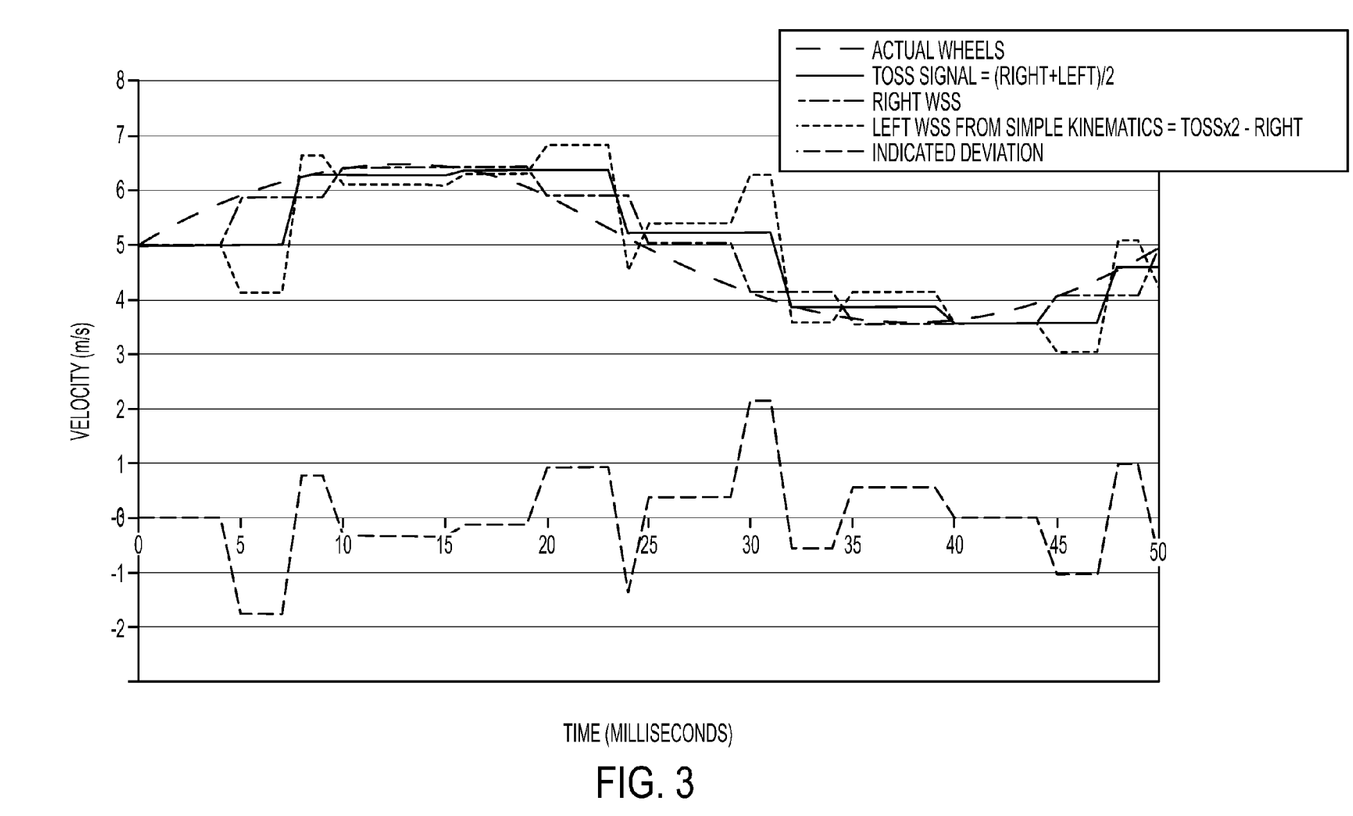
FIG. 3 is a chart showing the impact of different update intervals for a plurality of speed sensors on a calculation of a wheel speed.

The error between actual speed of a wheel and the calculated wheel speed (e.g., due to the delays above) can be further exacerbated by differences in the update speeds of the different sensors. For example, FIG. 3 shows the deviation of the calculated speed of a left rear wheel 120 where the right rear wheel speed sensor updates every 5 msec and the drive shaft speed sensor 140 updates every 7 msec.

To improve the performance of the system, more accurate determination of the wheel speed is needed. By taking into account past conditions (versus using only the latest readings), models can be developed to accurately estimate wheel speed.

For an open differential, the speed of a driven left wheel is defined by $$L(k)=2T(k)-R(k)$$

where:
  k is the control loop cycle,
  L(k) is the calculated speed of the left driven wheel at cycle k,
  T(k) is the measured transmission output speed at cycle k, and
  R(k) is the measured speed of the right driven wheel at cycle k.

Considering errors along with delays in the inputs for T and R, L(k) becomes L(k)=F(T(k), T(k−1) . . . R(k), R(k−1) . . . L(k), L(k−1) . . . other vehicle states) where:
  F is a function of a plurality of input variables.

The invention uses models to estimate the function F. Three methods or models are used: acceleration, Taylor Series, and drivetrain modeling. The acceleration method uses the acceleration of the left driven wheel to estimate the speed of the left driven wheel at cycle k. The following equation is used to perform the estimation:

$$L(k)=L(k-1)+L'(k-1)(dt)$$

where:
  L' is the first derivative of L, and
  dt is the cycle time.

Figure 4A:
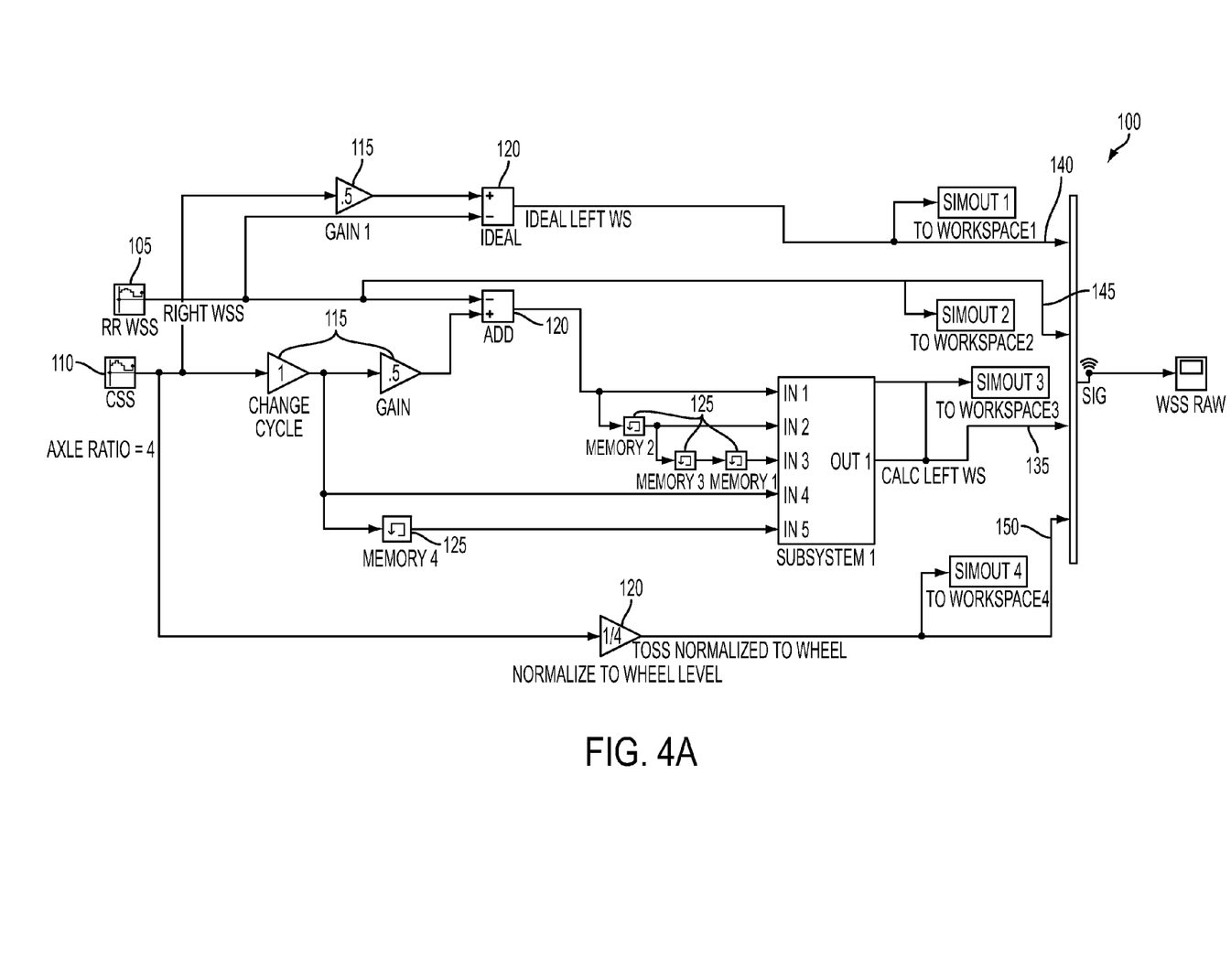
FIGS. 4A and 4B are a schematic of an acceleration model for determining a wheel speed.
Figure 4B:
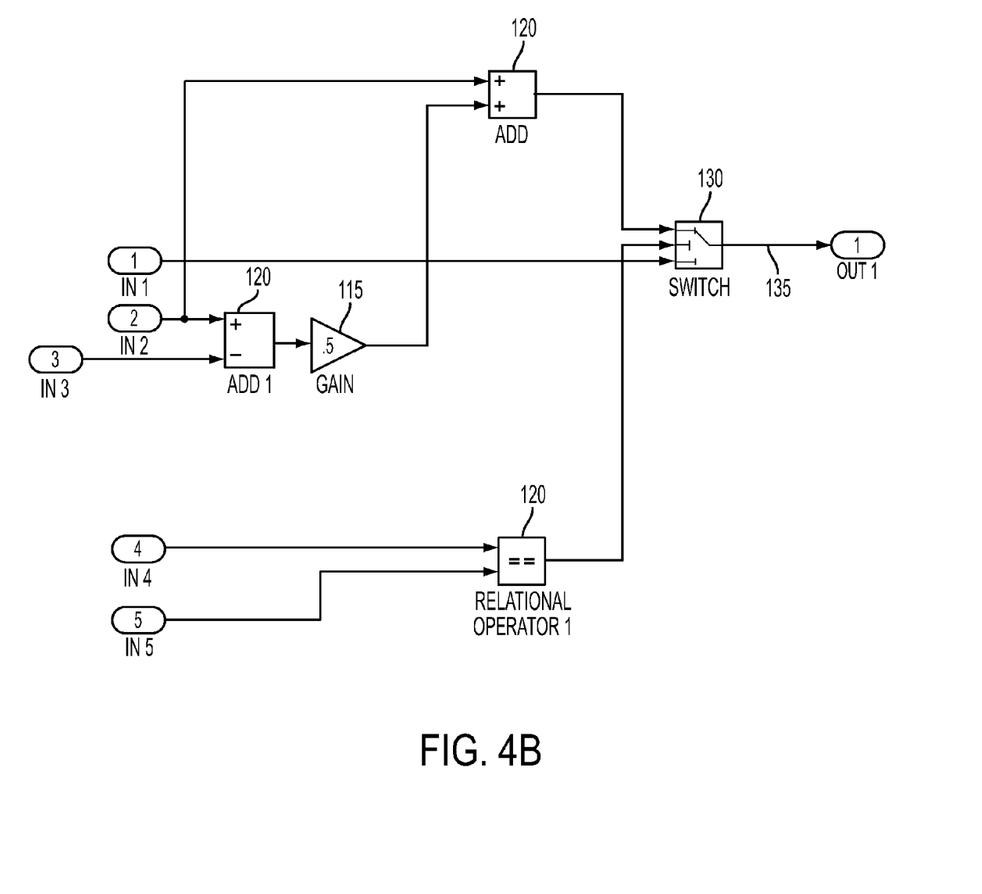

The calculations can be smoothed using a weighted average of several past cycles or a filtered value. Empirical vehicle data can also be used to limit a change in the estimated speed of the wheel to an absolute change. Acceleration can also be modeled as discussed below in relation to a drivetrain model. FIGS. 4A and 4B show a schematic of an acceleration model 100. A sensed speed of a right wheel 105 and a sensed speed of a driveshaft 110 are input into the model. As discussed above, the wheel speed sensor 170 and the driveshaft speed sensor 140 update their outputs at different time intervals (e.g., 5 msec for the wheel speed sensor 170 and 7 msec for the driveshaft speed sensor 140). By using various multipliers 115, adder/subtractors 120, and delays 125, the model 100 is able to compensate for the differences in signal updates. A switch 130 connects a correct signal to an output 135. The model 100 includes a three additional outputs 140, 145, and 150 for testing purposes.

A Taylor Series is a representation of a function as an infinite sum of terms calculated from the values of its derivatives at a single point. A Taylor Series for modeling the speed of a left driven wheel takes the form:

$$L(k)=L(k-1)+L'(k-1)(dt)/1!+L''(k-1)(dt)^2/2!$$

where:
  L' and L" are derivatives of L, and
  dt is the cycle time.

Again, the calculations can be smoothed using a weighted average of several past cycles or a filtered value. Empirical vehicle data can also be used to limit a change in the estimated speed of the wheel to an absolute change.

L(k) can also be estimated using various vehicle states including applied brake torque, friction co-efficient, and load on a wheel among others. The vehicle states can be calculated using a drivetrain model.

An example drivetrain model includes models of the (1) engine and torque converter pump assembly, (2) torque converter turbine and transmission input shaft, (3) transmission output shaft and drive shaft, (4) ring gear of the open differential, (5) torque transfer from the engine to the differential, (6) drive axle torque, and (7) total drive dynamics.

An engine and torque converter pump assembly model calculates the available torque converter pump output using engine combustion torque. Neglecting the elastic and friction term, the equation of motion can be simplified as:

$$T_p=T_e-J_e\omega_e \qquad (eq.\ 1)$$

where:
  $T_p$ is the torque output at the pump assembly,
  $T_e$ is the engine torque resulting from combustion,
  $J_e$ is the moment of inertia of the engine crankshaft, flywheel and torque converter pump assembly, and
  $\omega_e$ is the angular acceleration of the engine crankshaft, flywheel and torque converter pump assembly. In the software, the engine acceleration can be calculated from the engine speed.

Note: elastic, friction, and damping are neglected in the equations.

A torque converter turbine and transmission input shaft model calculates the available torque at transmission input shaft using:

$$T_I=T_p f(1/v)-J_I\omega_I \qquad (eq.\ 2)$$

where:
  $T_I$ is the torque output at the transmission input shaft,
  $\omega_I$ is the angular acceleration of the transmission input shaft,
  v is the speed ratio for the automatic transmission and is defined as,
  $\omega_I=\omega_e/v$ (Note: The above relation is not true for the angular acceleration of the torque converter.),
  G(1/v) is the torque converter multiplication factor as a function of 1/v, and
  $J_I$ is the moment of inertia of the turbine and transmission input shaft.

A transmission output shaft and drive shaft model calculates the available torque at drive shaft from:

$$T_d=T_I G_{tj}-J_d\omega_d \qquad (eq.\ 3)$$

where:
  $T_d$ is the available torque at the drive shaft pinion gear,
  $G_{tj}$ is the transmission gear ratio at jth gear,
  $J_d$ is the moment of inertia of the drive shaft (include transmission output shaft and its gear set), and
  $\omega_d$ is the angular acceleration of the transmission output shaft.

The angular acceleration has the following relation:

$$\omega_d=\omega_I/G_{tj} \qquad (eq.\ 3a)$$

The ring gear of the open differential model calculates the available torque at open differential ring gear using:

$$T_{rg}=T_d G_A-J_{rg}\omega_{rg} \qquad (eq.\ 4)$$

where:
  $T_{rg}$ is the available torque at the ring gear (also referred to as Cardan torque).

$G_A$ is the axle ratio,
$J_{rg}$ is the ring gear assembly moment of inertia, and
$\omega_{rg}$ is the angular acceleration of the ring gear (also referred to as Cardan acceleration).

The speed relation among ring gear, drive shaft and wheel speed is:

$$\omega_{rg} = \omega_d/G_A = (\omega_{AR} + \omega_{AL})/2 \qquad \text{(eq. 4a)}$$

where:
$\omega_{AR}$ is right driven axle acceleration, and
$\omega_{AL}$ is left driven axle acceleration.

Figure 5:
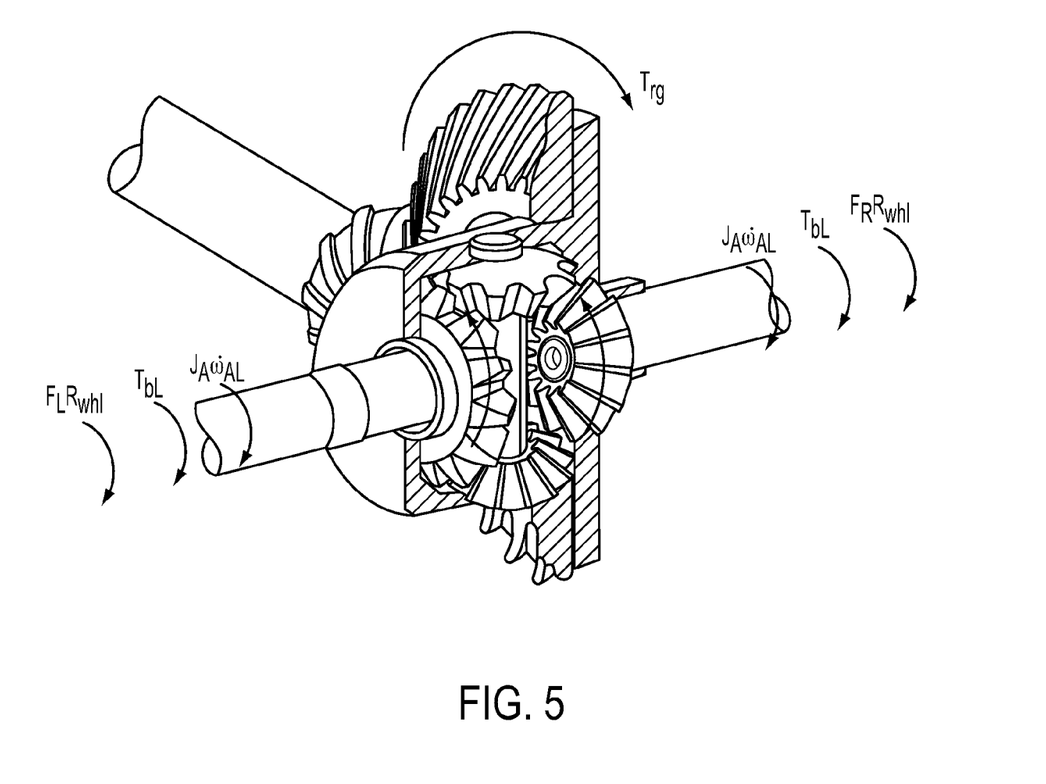
FIG. 5 is an exploded view of an open differential showing various torque transfer values.

FIG. 5 shows the location of the torque transfer variables in an open differential.

A torque transfer from engine to differential model calculates the available torque at the ring gear. The available torque at the ring gear can be described by engine combustion torque, engine rotational acceleration, and wheel rotational acceleration (a known variable).

Substituting torque equations (1), (2) and (3) into equation (4), results in:

$$T_{rg} = \{[T_e - J_e\omega_e]f(1/v) - J_t\omega_t]G_{tj} - J_d\omega_d\}G_A - J_{rg}\omega_{rg} \qquad \text{(eq. 5)}$$

Substituting speed equation (3a) and (4a) into equation 5 and simplifying it results in:

$$T_{rg} = f(1/v)G_{tj}G_A T_e - f(1/v)G_{tj}G_A J_e\omega_e - G_{tj}^2 G_A^2 J_t(\omega_{AR} + \omega_{AL})/2 - G_A^2 J_d(\omega_{AR} + \omega_{AL})/2 - J_{rg}(\omega_{AR} + \omega_{AL})/2 \qquad \text{(eq. 5a)}$$

where:
$f(1/v)G_{tj}G_A T_e$ is the engine torque amplified by the torque converter, transmission, and axle,
$f(1/v)G_{tj}G_A J_e\omega_e$ is the torque loss due to engine acceleration,
$G_{tj}^2 G_A^2 J_t(\omega_{AR}+\omega_{AL})/2$ is the torque loss due to transmission input shaft acceleration,
$G_A^2 J_d(\omega_{AR}+\omega_{AL})/2$ is the torque loss due to transmission output shaft acceleration, and
$J_{rg}(\omega_{AR}+\omega_{AL})/2$ is the torque loss due to ring gear acceleration.

A drive axle torque model calculates the drive axle torque for each drive axle. For an open differential, each drive axle torque is approximately half of the ring gear torque when neglecting torque lost at the spider or similar gear.

$$T_{AR} \sim T_{rg}/2 \sim T_R R_{whl} + T_{bR} + J_A \omega_{AR} \qquad \text{(eq. 6)}$$

$$T_{AL} \sim T_{rg}/2 \sim F_{TL} R_{whl} + T_{bL} + J_A \omega_{AL} \qquad \text{(eq. 6a)}$$

where:
$T_{AR}$ is the right drive axle torque,
$T_{AL}$ is the left drive axle torque,
$T_{bR}$ is the right brake torque,
$T_{bL}$ is the left brake torque,
$J_A$ is the moment of inertia of a single axle and wheel, and
$R_{whl}$ is the wheel radius.

A total drive dynamics model calculates the available torque at the differential ring gear (Kardan torque):

$$G(1/v)G_{tj}G_A T_e - G(1/v)F_{tj}G_A J_e\omega_e - G_{tj}^2 G_A^2 J_t(\omega_{AR}+\omega_{AL})/2 - G_A^2 J_d(\omega_{AR}+\omega_{AL})/2 - J_{rg}(\omega_{AR}\omega_{AL})/2$$

While the torque consumed at the axle is:

$$F_{TL}R_{whl} + T_{bL} + J_A\omega_{AL} + F_{TR}R_{whl} + T_{bR} + J_A\omega_{AR}$$

Where:
$F_{TL}R_{whl}$ is drive torque at the left wheel,
$T_{bL}$ is brake torque at the left wheel,
$J_A\omega_{AL}$ is inertia torque at the left wheel,
$F_{TR}R_{whl}$ is drive torque at the right wheel,
$T_{bR}$ is brake torque at the right wheel, and
$J_A\omega_{AR}$ is inertia torque at the right wheel.

Simplifying the total drive dynamics model results in:

$$[f(1/v)G_{tj}G_A]T_e - [f(1/v)G_{tj}G_A]J_e\omega_e - J_A(\omega_{AR}+\omega_{AL}) \sim (F_{TL}+F_{TR})R_{whl} + T_{bL} + T_{bR}$$

where:
$[f(1/v)G_{tj}G_A]$ is a drivetrain torque multiplication factor,
$T_e$ is engine torque,
$J_e\omega_e$ is engine acceleration,
$(\omega_{AR}+\omega_{AL})$ is kardan acceleration,
$[f(1/v)G_{tj}G_A]T_e$ is engine torque amplified by the torque converter, transmission and axle,
$[f(1/v)G_{tj}G_A]J_e\omega_e$ is inertia torque loss at the engine assembly,
$J_A(\omega_{AR}+\omega_{AL})$ is inertia torque loss at the wheel assembly,
$[f(1/v)G_{tj}G_A]J_e\omega_e - J_A(\omega_{AR}+\omega_{AL})$ is excess torque,
$(F_{TL}+F_{TR})R_{whl}$ is total drive torque,
$T_{bL}$ is brake torque at the left wheel, and
$T_{bR}$ is brake torque at the right wheel.

Another model of the drivetrain can be represented by a linear system of the form:

$$x_1 = Ax + Bu \qquad \text{(eq. 6a)}$$

$$y = Cx \qquad \text{(eq. 6b)}$$

where:
x is one or more vehicle states (including the relevant wheel speed),
u is one or more system inputs, and
y is one or more measurable vehicle output states that are dependent on x.

A closed loop observer (eqs. 7a and 7b below) can be constructed to estimate the states of x. The observer estimates the state of x faster than the system operates, allowing any errors to converge to zero. By feeding errors back into the observed and actual vehicle outputs, the system corrects, driving the error to zero. Thus:

$$x2 = Ax3 + Bu \pm L(y-y1) \qquad \text{(eq. 7a)}$$

$$y1 = Cx3 \qquad \text{(eq. 7b)}$$

where:
x2 is the estimated vehicle states (from the drivetrain model), and
y1 is the observer vehicle outputs.

Combining equations 6a and 6b with 7a and 7b results in:

$$x_1 - x_2 = A(x - x_3) - L(y - y_1)$$

$$y - y_1 = C(x - x_3)$$

The resulting error between observed and actual vehicle states (including wheel speed) is:

$$e = (A - LC)e_1$$

$$y - y_1 = Ce_1$$

Because these equations have no inputs, (A−LC) can be designed to be solved for any speed. Therefore, (A−LC) is designed to decay the error to zero for initial conditions. The vector L can be obtained and used in the observer (eq. 7a) to solve for the wheel speed.

The use of the above models enables a speed of a driven wheel to be predicted accurately. This allows a wheel speed sensor to be eliminated saving costs while improving the performance of systems that use the wheel speed.

Various features and advantages of the invention are set forth in the following claims.

What is claimed is:
1. A controller for a wheel speed detection system, the controller comprising:

a processor configured to receive the speed of a first driven wheel from a wheel speed sensor at a first update speed and the speed of a drive shaft from a drive shaft sensor at a second update speed different from the first update speed; and a non-transitory computer readable medium including program instructions executed by the processor for determining a speed of a second driven wheel based on a plurality of detected speeds of the first driven wheel and detected speeds of the drive shaft over time;

wherein the controller compensates for a difference in the first update speed and the second update speed, and compensates for delays in receiving the speed of the first driven wheel and the speed of the drive shaft such that an error between the determined speed of the second driven wheel and an actual speed of the second driven wheel is reduced to about zero.

2. The controller of claim 1, wherein the processor also uses an acceleration of the second driven wheel over time to determine the speed of the second driven wheel.

3. The controller of claim 1, wherein the processor determines the speed of the second driven wheel based on a Taylor Series calculation.

4. The controller of claim 3, wherein the processor determines the speed of the second driven wheel using a formula $$L(k)=L(k-1)+L'(k-1)(dt)/1\,!+L''(k-1)(dt)^2/2!$$

where:
L is the speed of the second driven wheel,
L' and L" are derivatives of L,
dt is a cycle time, and
k is a cycle.

5. The controller of claim 1, wherein the processor smoothes the determined speed of the second driven wheel using at least one of a weighted average and a filter.

6. The controller of claim 1, wherein the processor determines the speed of the second driven wheel using a model of a drivetrain.

7. The controller of claim 1, wherein the processor predicts the speed of the second driven wheel using a closed loop observer which converges errors in sensed parameters due to transmission delays and calculation delays to zero.

8. The controller of claim 1, wherein the controller determines the speed of the second driven wheel at a rate faster than at least one of the first update speed and the second update speed.

* * * * *